Figure 2:
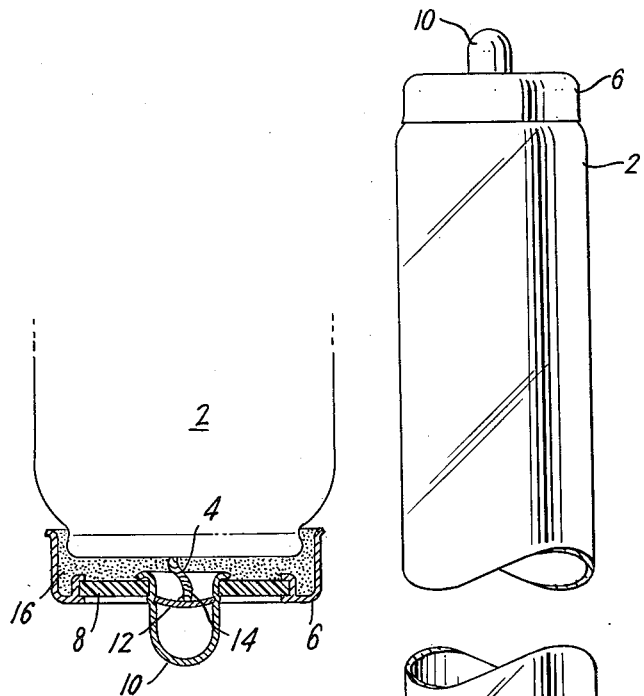

Dec. 19, 1961 S. C. SHAPPELL 3,014,196
LAMP BASE
Filed Sept. 26, 1958

INVENTOR
STANLEY C. SHAPPELL
BY
ATTORNEY

United States Patent Office 3,014,196
Patented Dec. 19, 1961

3,014,196
LAMP BASE
Stanley C. Shappell, West Boxford, Mass., assignor, by mesne assignments, to Sylvania Electric Products Inc., Wilmington, Del., a corporation of Delaware
Filed Sept. 26, 1958, Ser. No. 763,622
2 Claims. (Cl. 339—145)

This invention relates to the manufacture of electrical devices, and more particularly to the manufacture of electrical devices having lead-in wires extending therefrom and connected to the pins of bases or caps with which the electrical devices are provided.

In the manufacture of electric lamps, electronic tubes and the like, lead-in wires extending from the lamp or tube envelope are electrically connected to suitable contact members disposed in a base or cap with which the envelope is provided, thereby providing means through which electrical energy may be transmitted to filaments, electrodes and the like within the envelope. Considerable effort has been exerted over the years, in the manufacture of electric lamps and electronic tubes, to insure the attainment of a good electrical connection initially and the maintenance thereof during the life of the article.

Generally speaking, three different means have been employed, in various applications, to establish this electrical connection. They are crimping, soldering and welding. Crimping is usually effected by pinching a base pin through which a lead-in wire extends to obtain a mechanical joining of the lead-in wire to the pin. Soldering is usually effected by the application of a quantity of solder to the external tip of a base pin, within which a lead-in wire is disposed, the lead-in wire extending into the tip to be joined thereto by the solder. Welding is usually effected by the application of a welding electrode to the external surface of the tip of a base pin within which a lead-in wire is disposed, the lead-in wire extending into the tip to be joined thereto upon energization of the welding electrode. Each of these means is characterized by certain advantages. Unfortunately, there are also disadvantages associated therewith.

It will be noted that, in the practice of each of the aforementioned techniques, the external surface of the base pin is altered in some way. The base pin is indented when the lead-in wire is crimped to the pin. When the lead-in wire is soldered to the base pin, a body of solder is disposed on the tip of the pin. When the lead-in wire is welded to the external surface of the tip of the pin, the tip of the pin is made dirty thereby and is characterized by an irregular contour.

In the co-pending application of Harold I. Wiley and Stanley C. Shappell, entitled "Welding Method," Serial No. 763,509, filed September 26, 1958, and assigned to the same assignee as this application, an internal welding technique is described. In that application, it is suggested, inter alia, that a lead-in wire be welded to an inner surface of a base pin. Although this technique and its application as aforesaid represents a substantial improvement over the prior art, an ever greater improvement in the appearance of a base pin may be obtained by providing the base pin with an insert to which the lead-in wire is welded. Welding of the lead-in wire to an insert, with which a base pin is provided, eliminates the possibility of pin discoloration which may occur from time to time when a lead-in wire is welded directly to the inner face of the pin at the tip thereof. Another feature of the base of this invention is that it makes possible the use of a wide range of materials for fabrication of the pin without regard to its weldability, since the lead-in wire is welded to the insert, not to the main body of the pin. Thus the material of which the insert is made may be selected primarily on the basis of its weldability and the material of which the main body of the pin is made may be selected primarily on the basis of its ability to function as an electrical contact.

Figure 1:
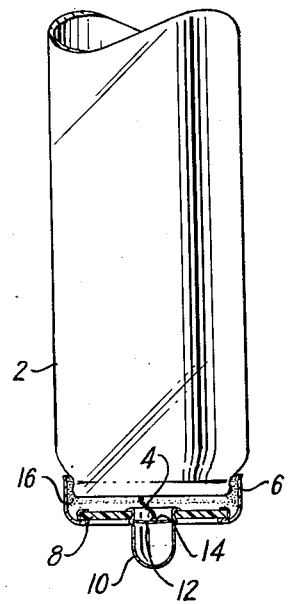

In the accompanying drawing, FIG. 1 is an elevational view of a fluorescent lamp with a base therefor shown partly in section to illustrate the base pin, the insert with which it is provided and the welding of the lead-in wire to the insert. FIG. 2 is a fragmentary detail, in section on an enlarged scale, of the base assembly shown in FIG. 1. The fluorescent lamp is one of the conventional commercial types, i.e., one in which an elongated, hermetically sealed, tubular envelope 2 is provided with a filamentary electrode at each end thereof supported by a pair of lead-in wires extending therefrom. In this instance, the pair of lead-in wires at each end of the lamp envelope are helically twisted to provide, in effect, a single, composite wire 4. The base comprises an annular metal shell 6, a wafer 8 of insulating material seated in the shell 6, a metal pin 10 secured to the wafer 8, and a metal disc 12 snugly fitted inside the pin 10 and defining an electrical contact for the composite wire 4. The composite wire 4 is welded to the metal disc 12 at 14 in accordance with the method taught in the aforementioned copending application of Wiley and Shappell entitled "Welding Method." After welding is effected, the base may be secured to the lamp envelope by means of basing cement 16 in a manner well known in the art.

Although in the specific embodiment of the invention illustrated in the accompanying drawing, the base is shown associated with a fluorescent lamp, it will be appreciated by those skilled in the art that the invention may be readily utilized in the manufacture of other electrical energy translating devices in which a base pin is employed as the means through which an electrical connection may be made between an electrical element within the device and an external electrical contact, such as an electrical socket for example.

What I claim is:

1. An electrical energy translating device comprising: an envelope having at least one lead-in wire extending therefrom; and a base positioned on said envelope, said base comprising a hollow metal pin and a metal disc snugly fitted within said pin, said lead-in wire being welded to the adjacent face of said disc.

2. A fluorescent lamp comprising: an hermetically sealed lamp envelope having at least one lead-in wire extending therefrom; and a base seated on said envelope, said base comprising a hollow metal pin and a metal disc snugly fitted within said pin, said lead-in wire being welded to the adjacent face of said disc.

References Cited in the file of this patent
UNITED STATES PATENTS

| | | |
|---|---|---|
| 230,090 | Watts | July 13, 1880 |
| 2,345,631 | Roberts | Apr. 4, 1944 |
| 2,424,435 | Collins | July 22, 1947 |
| 2,424,528 | Wild | July 22, 1947 |
| 2,439,886 | Denmark et al. | Apr. 20, 1948 |
| 2,627,048 | Lamb | Jan. 27, 1953 |
| 2,655,641 | Asaff | Oct. 13, 1953 |
| 2,677,118 | Stone | Apr. 27, 1954 |
| 2,864,067 | Grovemiller et al. | Dec. 9, 1958 |